United States Patent [19]

Sasagaki et al.

[11] Patent Number: 4,970,539
[45] Date of Patent: Nov. 13, 1990

[54] CAMERA WITH INCORPORATED FLASH DEVICE

[75] Inventors: Nobuaki Sasagaki; Masaharu Hara, both of Kawasaki, Japan

[73] Assignee: Nikon Corporation, Tokyo, Japan

[21] Appl. No.: 284,658

[22] Filed: Dec. 15, 1988

[30] Foreign Application Priority Data

Dec. 21, 1987 [JP] Japan .................................. 62-323409
Dec. 22, 1987 [JP] Japan .................................. 62-324885

[51] Int. Cl.⁵ ............................................ G03B 15/03
[52] U.S. Cl. ............................ 354/149.1; 354/149.11
[58] Field of Search .................. 354/126, 145.1, 149.1, 354/149.11

[56] References Cited

U.S. PATENT DOCUMENTS 4,515,453 5/1985 Wakabayashi et al. ..... 354/149.11 X
4,743,929 5/1988 Taniguchi et al. ........... 354/149.1 X

FOREIGN PATENT DOCUMENTS 275089 7/1908 European Pat. Off. ........ 354/149.11
83921 5/1985 Japan ................................ 354/149.1

*Primary Examiner*—Brian W. Brown
*Attorney, Agent, or Firm*—Shapiro and Shapiro

[57] ABSTRACT

A camera with a flash device comprises: flash emission means, regulating means for regulating the irradiating angle of the light from the flash emission means, the regulating means having at least a first state and a second state wherein the irradiating angle in the first state is wider than that in the second state, a photographing lens, displacing means for displacing the flash emission means between a first position and a second position which is more distant than the first position from the optical axis of the photographing lens, a drive shaft to be rotated by a motor, and transmission means for transmitting the rotation of the drive shaft to the regulating means in case of the rotation of the drive shaft in a direction, and transmitting the rotation of the drive shaft to the displacing means in case of the rotation of the drive shaft in the other direction, whereby the regulating means is adapted to shift from one of the first and second states to the other in response to the rotation of the drive shaft in the first-mentioned direction, and the displacing means is adapted to shift from one of the first and second positions to the other in response to the rotation of the drive shaft in said the other direction.

15 Claims, 12 Drawing Sheets

CAMERA WITH INCORPORATED FLASH DEVICE

BACKGROUND OF THE INVENTION

1. Field of the Invention

The present invention relates to the function of a flash device, in a camera incorporating the flash device.

2. Related Background Art

There are already known lens-shutter cameras and single lens reflex cameras in which a flash device is incorporated and automatically protrudes from the camera body (hereinafter called pop-up function) according to the luminosity of the object. Recently it has been proposed to associate not only such pop-up function to such flash device but also various functions relating to the performance of the flash device.

SUMMARY OF THE INVENTION

An object of the present invention is to provide a camera capable of achieving various functions relating to the flash device in a compact structure.

DESCRIPTION OF THE PREFERRED EMBODIMENTS

Now the present invention will be described with reference to embodiments thereof shown in the attached drawings.

Figure 1:
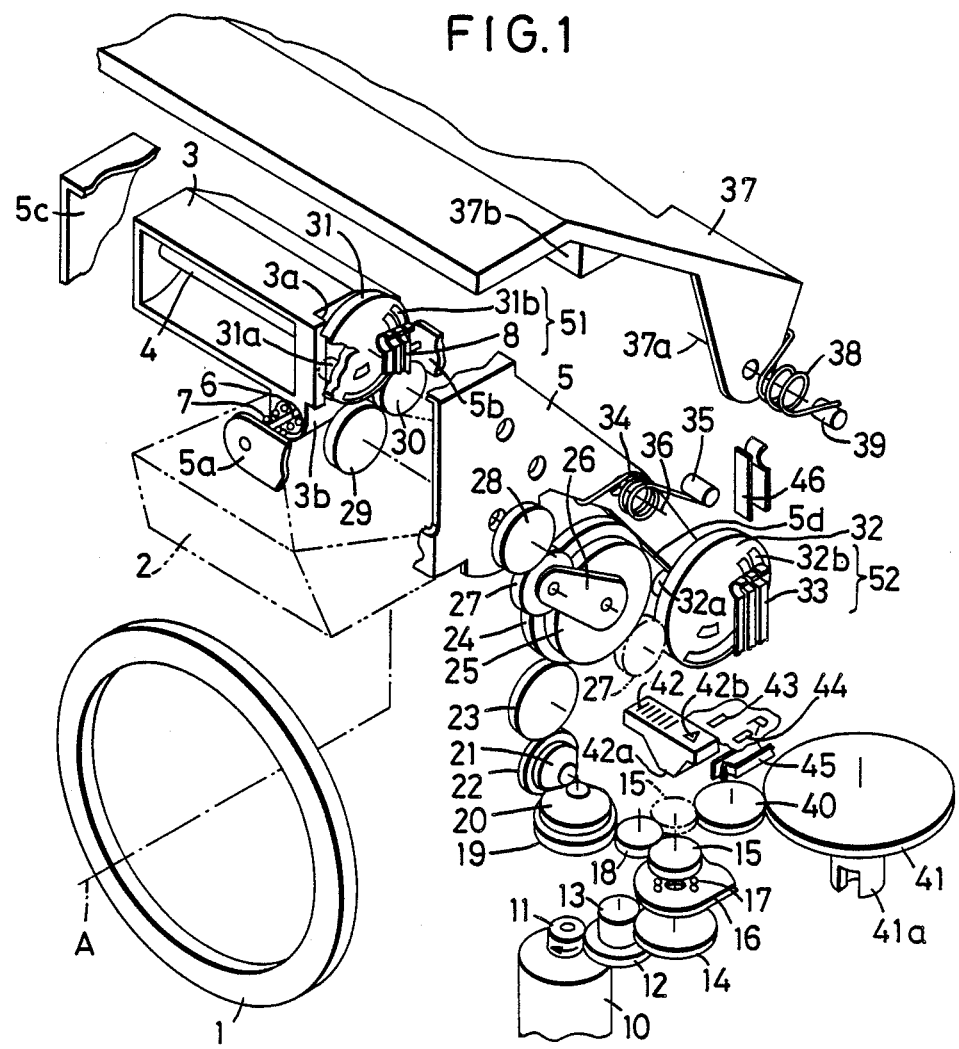
FIG. 1 is a perspective view of the driving mechanism of a camera with incorporated flash device embodying the present invention.

FIG. 1 illustrates the driving mechanism of a single lens reflex camera embodying the present invention.

In FIG. 1 there are shown a bayonet mount for mounting interchangeable lenses; a pentagonal prism 2; and a flash case 3 incorporating a light emitting unit, incorporating a flash tube 4 therein, of the flash device. A indicates the optical axis of the interchangeable lenses.

A support member 5, supporting the flash case 3, is rendered rotatable with respect to the camera body, about a shaft 36. Another shaft (not shown) like shaft 36 is likewise provided on the other portion 5c of the support member 5. Said support member is biased clockwise by a spring 34 hooked on a pin 35 fixed on the camera body.

A shaft 6 is fitted in a part 3b of the flash case 3, whereby the flash case 3 is rendered movable along said shaft 6. The ends of said shaft 6 are fixed to arms 5a, 5B of the support member 5. A compression spring 7 is provided between the arm 5a and the part 3b of the flash case whereby the flash case 3 is biased to the right with respect to the support member 5.

In front of the flash case 3 a diffusing plate (not shown) for diffusing the light from the flash tube 4 is fixed to the support member 5. Thus the above-mentioned axial movement of the flash case 3 along the shaft 6 varies the distance between the flash tube 4 and the diffusing plate, thereby achieving so-called zoom flash function for varying the flash irradiating angle.

In the front portion of the film rewinding part of the camera (lower right part in the illustration) there is provided a motor 10, of which rotation is transmitted through a pinion gear 11 and a train of reducing gears 12, 13, 14 to a gear 15 integrally rotating with the gear 14. Said gear 15, being vertically movable, transmits the rotation of the gear 14 either to a gear 18 at a lower position or to a gear 40 at a higher position.

The gear 15 is biased upwards by a compression spring 17 provided on a support member 16 fixed to the camera body. In a state shown in FIG. 1, the upper face of the gear 15 is in contact with a cam face 42a provided on the lower face of an operating member 42 to be explained later, whereby the gear 15 is in the lower position meshing with the gear 18.

The rotation transmitted to the gear 18 is further transmitted, through a gear 19, a bevel gear 21 integral with the gear 19, another bevel gear 21 and gears 22, 23, to a gear 24. A gear 25 integral with said gear 24 meshes with a gear 27, and, said gears 25, 27 and an arm 26 constitute a planet gear mechanism serving as switching means. The shafts of the above-mentioned gears 12-15, 18-25 are all supported by the camera body or support members integral therewith. The shaft of the gear 27 is supported by the arm 26.

A gear 28, capable of meshing with the gear 27, is so provided on the support member 5 as to be integrally rotatable with a gear 29, which transmits rotation through a gear 30 to a gear 31. Said gears 30, 31 are rotatably fitted on shafts (not shown) provided on the support member 5. On the gear 31 there is provided a pin 31a to be explained later, which can engage with a flange 3a provided at an end of the flash case 3. The rotational position of the gear 31 can be detected from electrical connection between position detecting patterns 31b provided on the gear 31 and brushes 8 provided on the support member 5. Said patterns 31b and brushes 8 constitute position detecting means 51.

A gear 32, which meshes with the above-mentioned gear 27 when it is in the phantom-line position, is rotatably supported by the camera body, and holds, on a face thereof, a pin 32a engageable with an arm 5d of the support member 5.

On the other face there are provided position detecting patterns 32b, which are in electrical connection with brushes 33 provided in the camera body to enable detection of rotational position of the gear 32. Said patterns 32b and brushes 33 constitute position detecting means 52.

A cover 37, for covering said support member 5, is articulated at an end thereof by a shaft 37a to the camera body, whereby the other end of the cover 37 is movable between a pop-up position in which said the other end is lifted from the camera body for enabling the use of flash, and a pop-down position in which said the other end is close to the camera body to disable the use of flash. The popping up is to separate the flash unit from the optical axis of the lens at the flash operation. The cover 37 is biased anticlockwise, namely in a direction of closing the cover (pop-down direction), by a spring 38 hooked on a pin 39 provided on the camera body. Inside said cover 37 there is provided a protruding part 37b to be explained later.

A film rewinding switch 42, provided on the external face of the camera, enables or disables the film rewinding operation as it is moved to match a mark 42b thereof with a mark 43 or 44 formed on the camera. In the state shown in FIG. 1, in which the mark 42b is aligned with the mark 43, the cam face 42a formed on the lower face of the switch 42 pushes the gear 15 downwards whereby said gear 15 meshes with the gear 18. When the mark 42b is aligned with the mark 44, a switch 45 is turned on, and said cam face 42a is disengaged from the upper face of the gear 15, whereby the gear 15 moves upwards by the force of the spring 17 and meshes with the gear 40, which meshes with a gear 41 and rotates a fork member 41a provided thereon. Said fork member 41a engages with a hub at the end of a spool in a 35 mm film cartridge and serves to rewind the photographic film thereinto when the photographing operations are completed. A switch 46 is turned on when said support member 5 is in a state close to the camera body (pop-down position).

In the following there will be explained the functions of the components of the embodiment shown in FIG. 1. FIG. 1 shows a pop-up state of the flash case 3, wherein the cover 37 is lifted from the camera body to enable the use of flash. When the motor 10 is rotated anticlockwise (opposite to the arrow marked on the gear 11) in this state, the rotation of said motor is transmitted through the gears 11–15, 18–24 to rotate the gear 25 to the right (clockwise). Thus the arm 26 coaxially rotates to the right, whereby the gears 27 and 28 mutually mesh to rotate the gear 28 to the right. Consequently the gear 29 rotates to the right, and the gear 31 likewise rotates to the right through the gear 30.

When the motor 10 is rotated clockwise, the gear 25 rotates to the left, whereby the arm 26 coaxially rotates to the left (anticlockwise). Thus the gear 27 is disengaged from the gear 28 and meshes with the gear 32, which likewise rotates to the left.

Figure 2A:
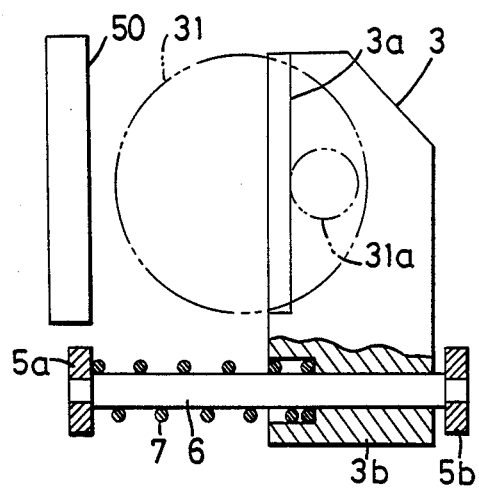
FIGS. 2A, 2B and 2C are magnified cross-sectional views of a driving system for varying the light irradiating angle.
Figure 2B:
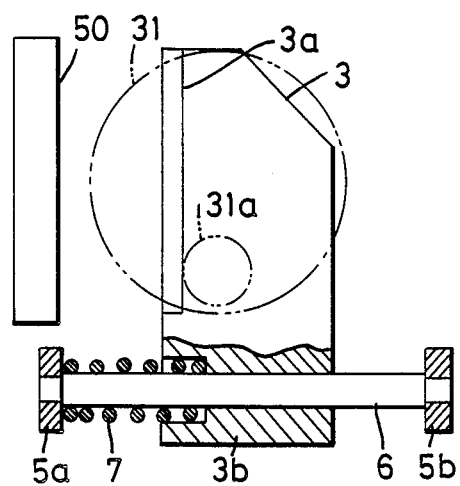
Figure 2C:
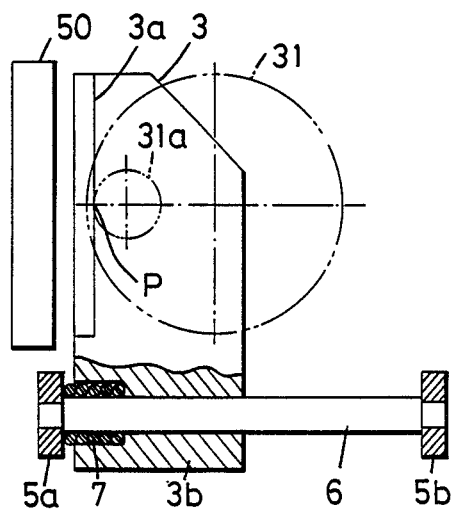

Now reference is made to FIGS. 2A, 2B and 2C, for explaining the relationship between the flash case 3 and the gear 31. FIGS. 2A, 2B and 2C illustrate the movement of the flash case 3 caused by the rotation of the gear 31, wherein numbers correspond to those in FIG. 1. A number 50 indicates a diffusing plate.

The gear 31 is rotated clockwise by the motor 10, whereby the pin 31a also moves in the circumferential direction. FIGS. 2A shows a state in which the pin 31a is most distant from the diffusing plate 50. In this state, since the flash case 3 is biased by the spring 7 to the right, the position of the flash unit 3 is defined by the engagement of the flange 3a with the pin 31a. In this state the flash tube 4 is most distant from the diffusing plate 50, so the irradiating angle of the flash light becomes narrow. This state is called a telezoom state (smallest irradiating angle position in the first embodiment, or longest position in the second embodiment. In this state a signal indicating the telezoom state (hereinafter called tele signal) is released from the position detecting means 51.

FIG. 2B illustrates a state in which the gear 31 has turned by about 90° to the right. The rotation of the gear 31 to the right causes the pin 31a to push the flange 3a to the left, thereby moving the flash case 3 to the left against the biasing force of the spring 7. The state shown in FIG. 2B is called a normal zoom state, positioned between the telezoom state and a wide zoom state to be explained later. In this state, the position detecting means 51 releases a normal signal.

FIG. 2C illustrates a state in which the pin 31a is closest to the diffusing plate 50, as the result of further rotation of the gear 31 to the right. In this state the flash tube 4 is closest to the diffusing plate 50 whereby the irradiating angle of the flash light becomes wider. This state is called a wide zoom state (largest irradiating angle position in the first embodiment, or shortest position in the second embodiment). In this state the position detecting means 51 releases a wide signal.

A further rotation of the gear 31 to the right causes the flash case 3 to move to the right by the force of the spring 7, thus restoring the state shown in FIG. 2A. In this manner a full turn of the gear 31 causes a reciprocating motion of the flash case 3 between the telezoom position and the wide zoom position. In the course of said motion, when the pin 31a is in a position opposite to that shown in FIG. 2B, the flash case 3 reaches a position the same as that shown in FIG. 2B, but the position detecting means 51 does not release any signal in this state.

In the following there will be explained the entire function in more detail with reference to FIGS. 1, 3A and 3B. The transmission system from the motor 10 to the gear 24 is omitted in FIGS. 3A and 3B.

Figure 3A:
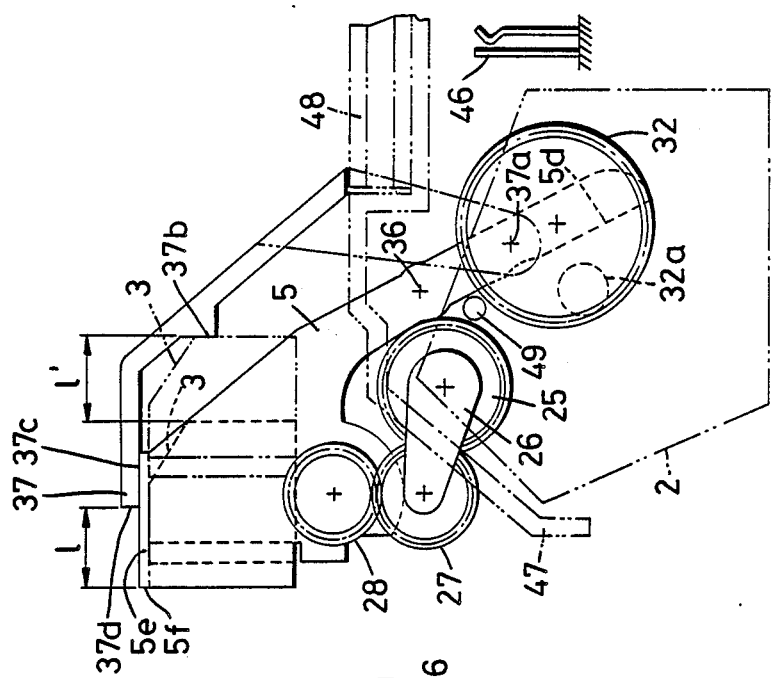
FIGS. 3A and 3B are magnified cross-sectional views of a flash device driving system.

At first, FIG. 3A illustrates a pop-up state of the flash case 3. The pin 32a on the gear 32 is in the illustrated position, as will be explained later. There are further shown an upper cover 47 of the camera body; an accessory shoe for mounting a separate flash device; and a pin 49 provided on the camera body.

In the state shown in FIG. 3A, the support member 5 is biased clockwise about the shaft 36, namely in the ascending direction of the flash case 3, by the spring 34 shown in FIG. 1. The movement caused by said biasing is limited by the engagement of an end 5d of the support member 5 with the pin 49 provided on the camera body, thus defining the illustrated pop-up state. In this state the cover 37, of which lower face 37c is lifted by the upper part 5e of the support member 5, rotates to the right about the shaft 37a whereby a front end 37d of the cover 37 moves to a position of a distance l from an end 5f of the support member 5. Said distance l is substantially equal to the amount l' of movement of the flash case 3 from the aforementioned telezoom state to the wide zoom state, whereby a space is formed, as shown by (3) in FIG. 3A, between the support member 5 and the protruding part 37b of the cover 37, to enable movement of the flash case 3 to the telezoom state. The spring 38 for anticlockwise biasing the cover 37 (FIG. 1) is sufficiently weaker than the spring 34 for clockwise biasing the support member 5, thus not hindering the rightward rotation of the support member 5. In the pop-up state the switch 46 is turned off, and the position detecting means 52 shown in FIG. 1 releases an up signal indicating the pop-up state.

When the gear 25 is rotated to the right by the motor 10 in this state, the arm 26 is also rotated to the right as explained before, whereby the gears 27 and 28 mesh each other. The rightward rotation of the gear 28 moves the flash case to the left in FIG. 3A, as shown in FIGS. 2A-2C, thereby achieving a zooming operation.

Then, let us consider a case where the motor 10 is reversed to right in the wide zoom state, represented by 3 in FIG. 3A. Thus the gear 25 turns to the left, whereby the arm 26 likewise rotates to the left to disengage the gear 27 from the gear 28. In this state, since the center of the gear 31, the center of the pin 31a, and the contact point P between the pin 31a and the flange 3a of the flash case 3 are in a linear relationship as shown in FIG. 2C, the flash case 3 cannot be moved to the right by the spring 7 and is therefore maintained in the wide zoom state.

The continued rotation of the arm 26 to the left causes the gear 27 to mesh with the gear 32, thereby causing the same to rotate to the left. The pin 32a provided thereon moves accordingly and engages with the end 5d of the support member 5, thus pushing said end 5d to the right in FIG. 3A. Because of said pushing action, the support member 5 starts rotation to the left about the shaft 36, against the force of the spring 34 shown in FIG. 1, thus reaching the pop-down state shown in FIG. 3B.

In the course of this movement, the cover 37 turns to the left about the shaft 37a by the function of the spring 38 shown in FIG. 1, whereby the end 37d of said cover 37 substantially coincides with the end 5f of the support member 5 in the pop-down state. This result is obtained from the different between the center 36 of rotation of the support member and the center 37a of rotation of the cover, and has the effect of reducing the dimension of the camera in the pop-down state.

Figure 3B:
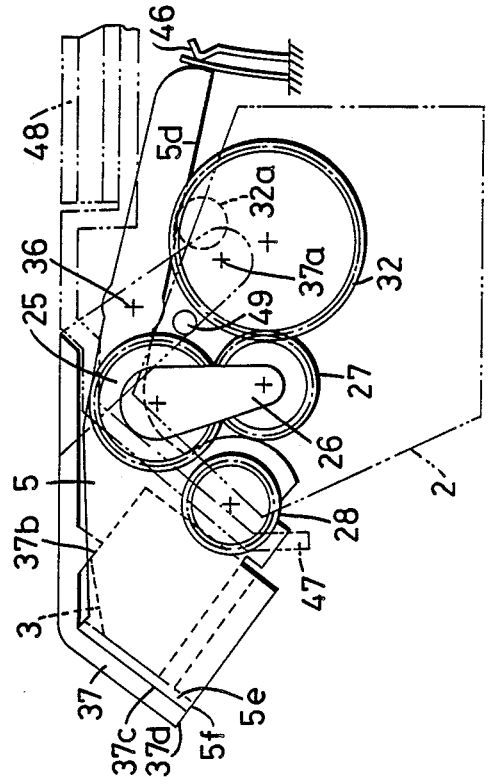

In the pop-down state shown in FIG. 3B, the switch 46 is turned on, and the position detecting means 52 shown in FIG. 1 releases a down signal, indicating the pop-down state. When the motor 10 is rotated to the right again in this state, the gear 32 likewise rotates to the left, and the support member 5 rotates to the right according to the movement of the pin 32a under the action of the spring 34, thus resuming the pop-up state shown in FIG. 3A.

Figure 4:
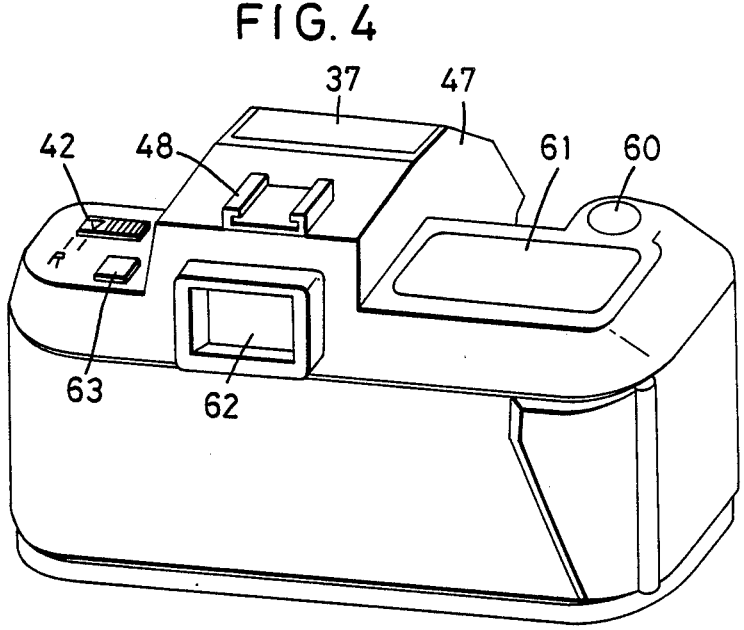
FIG. 4 is a rear perspective view of the camera with incorporated flash device.

FIG. 4 is a rear view of a camera embodying the present invention, wherein the numbers 37, 42, 37 and 48 indicate the same components as explained before.

A shutter release button 60 turns on a first (half-push) switch in the middle of the depressing stroke thereof, and also turns on a second (release) switch when further depressed. An external display unit 61, provided on the upper face of the camera and composed for example of a liquid crystal display unit, is used to indicate the shutter speed, diaphragm aperture, and state of the flash device to be explained later. Another display unit is provided inside a finder viewing window 62. A button 63 selects the flash photographing modes as will be explained later.

Figure 5:
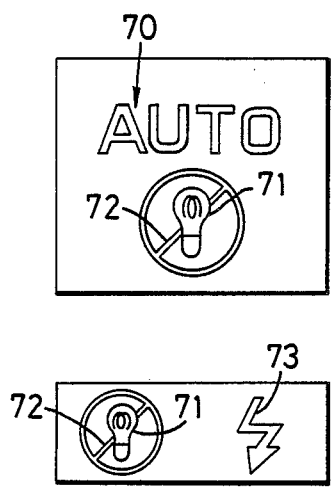
FIG. 5 is a view showing the form of flash mode display.

FIG. 5 illustrates modes of display on said display units 61 and on said display unit in the finder, respectively in the upper and lower parts. At first the meaning of the displays will be explained with reference to FIG. 5, which shows all the display segments relating to flash operations for the purpose of explanation and is therefore different from the actual display state in use. It is to be noted that, in FIG. 5, omitted are other displays, such as that relating to the shutter speed, not related directly to the present invention.

In FIG. 5, a segment 70 indicates an automatic flash mode to be explained later, and is displayed only in said automatic mode. Segments 71, 72 indicate whether the flash operation is enabled or disabled. The flash is given when the segment 71 alone is displayed but the segment 72 is not displayed, and the flash is not given when both segments 71, 72 are displayed. The segments 71, 72 are shown both on the external display unit and on the in-finder display unit. A segment 73 indicates the charging state of the flash device. In the state of flash operation in which the segment 71 is turned on but the segment 72 is turned off, the completed or incomplete state of charging is respectively indicated by the on or off state of said segment 73. Said segment 73 may be intermittently turned on, as will be explained later, in the non-flash state, in order to recall the use of flash to the operator.

Figure 6:
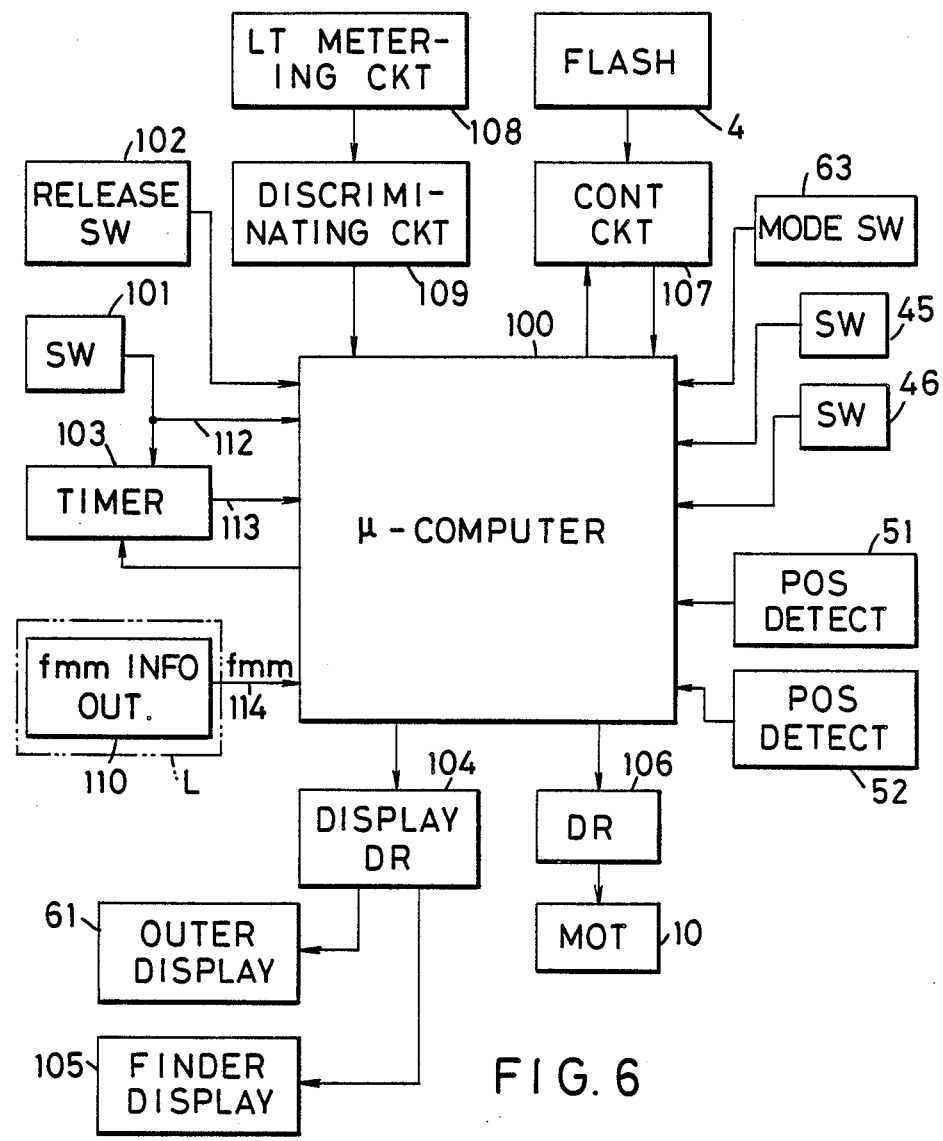
FIG. 6 is a block diagram of an electric control circuit.

Now reference is made to FIG. 6 for explaining the electrical circuit of the present embodiment. In FIG. 6 there are omitted circuits not directly related to the present invention, such as the film winding control circuit. A microcomputer 100 is connected to the aforementioned switches 45, 46, 63, position detecting means 51, 52, half-push switch 101 and release switch 102. A timer 103 provided between the half-push switch 101 and the microcomputer 100 serves to turn on the power supply to the camera for a predetermined period even after the half-push switch is turned off. To said timer 103 there is also connected a signal line 111 for entering a signal, indicating the completion of shutter releasing operation, released from the microcomputer 100.

The timer 103 functions in the following manner. When the release button (60 in FIG. 4) of the camera is half pushed to turn on the switch 101, the timer 103 is reset to shift a line 113 to the H-level. If the half-push switch 101 is turned off without the release switch 102 being turned on, the line 113 is maintained at the H-level for several seconds (for example 7 seconds) after said turning off, and is shifted to the L-level thereafter.

On the other hand, if the release switch 102 is turned on to effect the photographing operation in the camera, the timer 103 receives the signal on the line 111 released at the completion of said photographing operation, and, if the half-push switch 101 is turned off at this point, the line 113 is maintained at the H-level for about a second from the reception of the signal on the line 111, and is shifted to the L-level thereafter. If the half-push switch 101 is on at the reception of the signal from the line 111, the line 113 is shifted to the L-level about 7 seconds after the turning off of the half-push switch as explained before.

A display driving circuit 104 drives the aforementioned external display unit 61 and the in-finder display unit 105 under the control of the microcomputer. A motor driving circuit 106 drives the aforementioned motor 10 under the control of the microcomputer.

A flash control circuit 107 for controlling the flash emission from the aforementioned flash device 4 receives signals, for example that instructing the start of charging, from the microcomputer. Also the flash control circuit 107 sends a signal, indicating the completion of charging, to the microcomputer.

A flash use discriminating circuit 109 performs a predetermined analysis on the output of a light metering circuit 108 of the camera, then discriminates whether the flash emission is necessary or not, and sends the result of said discrimination to the microcomputer.

A focal length information output circuit 110 sends a signal fmm, indicating the focal length of the lens, to the microcomputer.

In the following there will be explained the function of the present embodiment, controlled by the microcomputer 100, with reference to FIG. 6 and flow charts shown in FIGS. 7 to 14.

Figure 7:
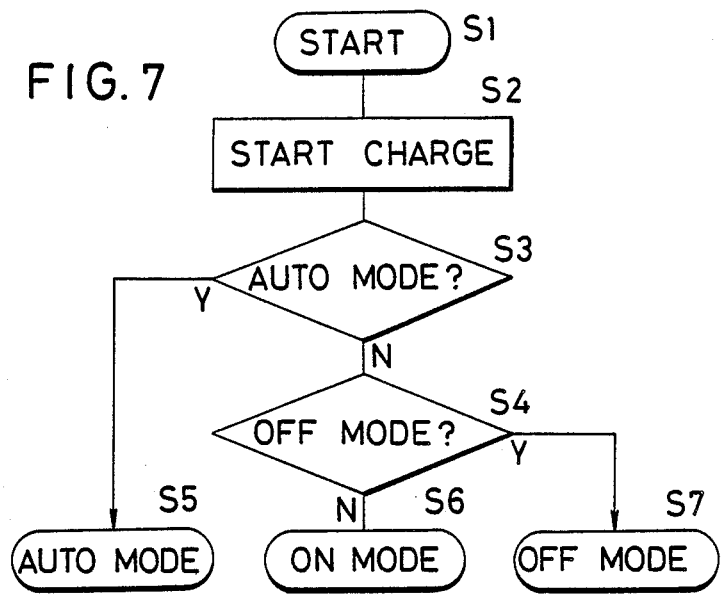
FIG. 7 is a flow chart showing the function of an embodiment.
Figure 8:
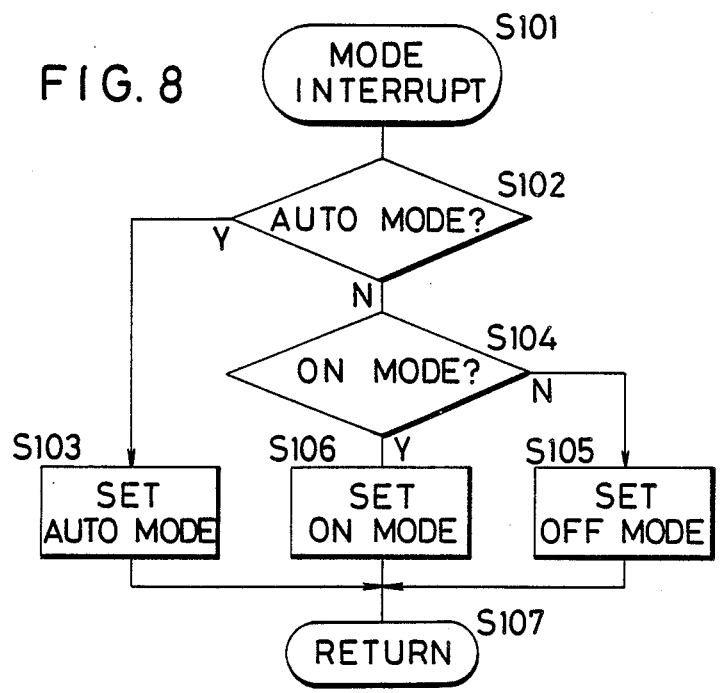
FIG. 8 is a flow chart showing a mode interruption sequence.

At first, when the half-push switch 101 or a power switch is turned on, the control sequence starts from a step S1 shown in FIG. 7. A step S2 sends a charge start signal to the flash control circuit 107. Said charge start signal is terminated when the charging is completed. A step S3 discriminates whether the current flash mode is the automatic mode, and a step S4 discriminates whether the current flash mode is the off mode. The sequence branches to control routines corresponding to the current flash mode.

In the following there will be explained flash modes. The camera of the present embodiment has three flash modes, namely the automatic mode, on mode and off modes.

In the automatic mode, the camera automatically discriminates whether or not to emit the flash light, for example according to the luminosity of the object. In the on mode, the flash light is forcedly emitted regardless of the luminosity of the object. In the off mode, the flash light emission is prohibited in any situation.

These modes are selected by the switch 63. When said switch 63 is turned on, the control sequence of the microcomputer proceeds to a mode interruption routine shown in FIG. 8. This routine changes the mode to the on mode if the automatic mode is currently selected, or to the off mode if the on mode is currently selected, or to the automatic mode if the off mode is currently selected. Stated differently, the flash modes are cyclically changed in response to each depression of the switch 63. The microcomputer 100 counts the number of said depressions by an internal counter from zero to two. When the count reaches two, said internal counter is reset. The count zero indicates the automatic mode. Then a step S107 restores the normal control sequence.

When the switch 63 is turned on, the sequence proceeds to a step S101. In a next step S102, the microcomputer 100 discriminates, by reading the content of the internal counter, whether the automatic mode is selected, and, if it is selected, the sequence proceeds to a step S103 for displaying the automatic mode for example on the display unit 61. A step S104 discriminates whether the on mode is selected, and, if it is selected, a step S106 displays the on mode on the display unit 61. If the off mode is selected, a step S105 displays the off mode on the display unit 61.

In the following there will be explained the control sequence in the automatic mode, with reference to the flow chart shown in FIG. 9. In said automatic mode, the flash emission unit is lifted up if the object is of a low luminosity, and is maintained in this state once it is lifted.

After the automatic mode is started by a step S5, a step S9 discriminates whether the flash light emission is required, according to an input signal from the flash discriminating circuit 109. If the flash light emission is unnecessary, the sequence proceeds to a step S10 to send an instruction for prohibiting the flash light emission to the flash control circuit 107. Then a step S11 controls the display segments 70, 71, 72 shown in FIG. 5A. Thereafter the sequence returns to the step S9.

On the other hand, if the step S9 discriminates the necessity of flash light emission, a step S12 reads the position signal from the position detecting means 52, and a step S13 discriminates whether the gear 32 is in a pop-up position. If not, a step S14 turns the motor 10 to the right, thereby rotating the gear 32 and lifting the support member 5 as described before. When the lifting operation is completed, the sequence proceeds to a step S15 for sending a signal enabling the flash light emission to the flash control circuit 107. In response to said flash enable signal, the flash control circuit 107 reaches a state of causing the flash unit 4 to emit the flash light when a flash start signal is received from the microcomputer 100 corresponding to the actuation of the release switch 102. More specifically, the control circuit 107 opens a gate for transmitting said flash start signal to the flash control unit, in response to said flash enable signal.

Then a step S16 reads the fmm signal, indicating the focal length, from the focal length output circuit 110, and a step S17 receives information on the position of the flash case 3 from the position detecting means 51. Then a step S18 compares these signals to discriminate whether the flash case 3 is in a position corresponding to the focal length fmm, and, if both signals are different, a step S19 turns the motor to the left, thereby zooming the flash case 3 as described before.

On the other hand, if both signals are same in the step S18, a step S20 discriminates whether a charge completion signal has been released from the flash control circuit 107. If the charging is completed, a step S21 activates the display segments 70, 71 and 73. If the charging is not complete, a step S22 deactivates the display segment 73. From the step S21 or S22, the sequence returns to the step S9.

After the flash unit is once lifted, it is not lowered but the flash light emission alone is prohibited when the flash emission is identified unnecessary for a different object. This avoids frequence popping up and down for objects of which luminosity is close to the limit of requiring or not requiring the flash light emission.

Then a step S19 stores, in an internal register, the position data read in the step S16, and awaits that the output from the position detecting means 51 coincides with the content of said internal register. Then the sequence proceeds to step S17 and S18.

The operator can know whether the flash light is to be emitted, by the display on the display unit.

In the following there will be explained the control sequence in the on mode according to the flow chart shown in FIG. 10. The one mode is started in the step S7. A succeeding step S23 is identical to the steps S12 to S15 shown in FIG. 9, and a step S24 is identical to the steps S17 to S19 shown in FIG. 9. Thus, in the on mode, the lifting of the flash unit and the zooming operation are conducted regardless of the luminosity of the object, and the flash light is emitted at each depression of the release button. A step S26 activates the display segments 71 and 73, and a step S33 activates the display segment 71.

Figure 9:
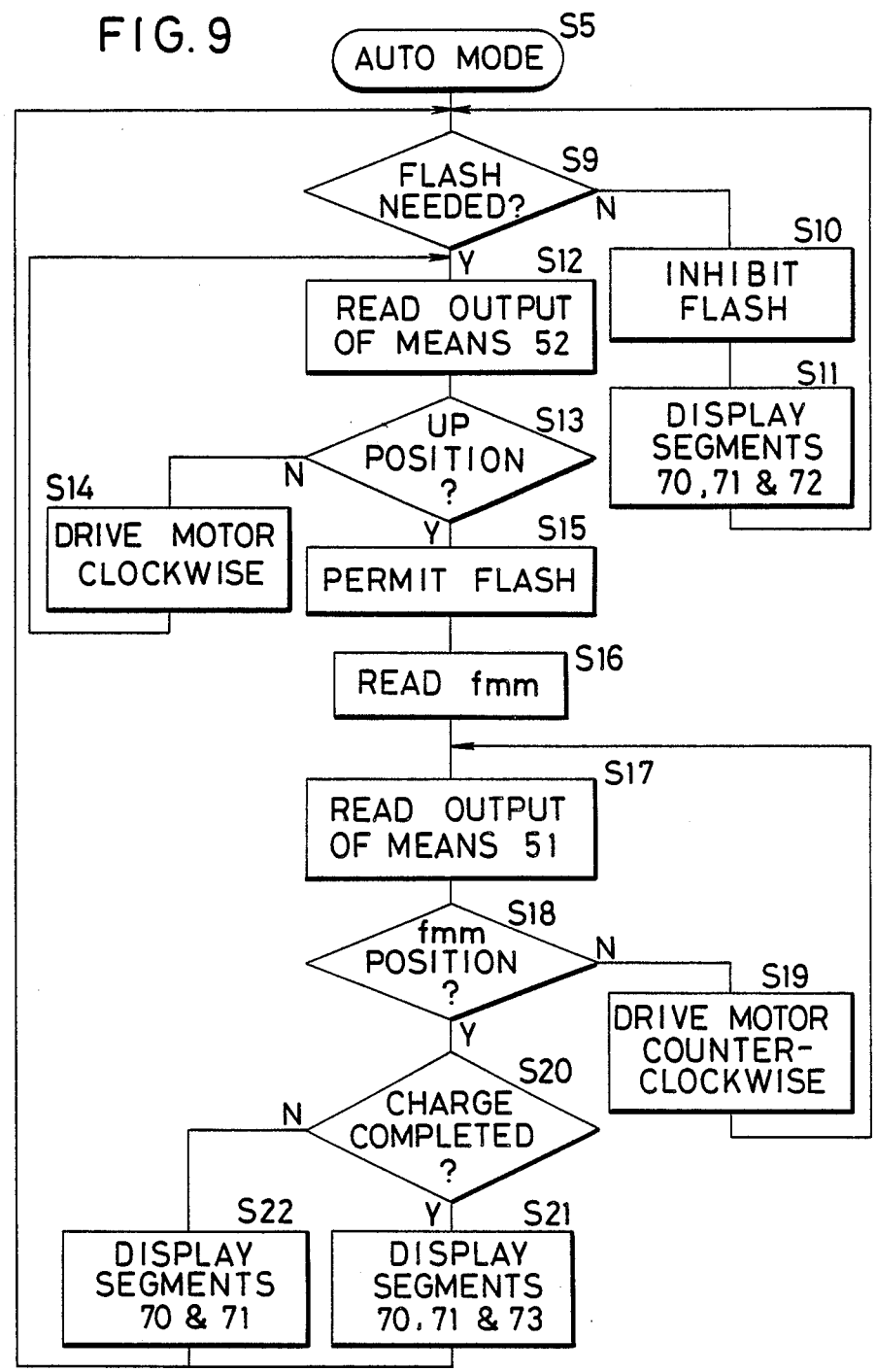
FIG. 9 is a flow chart showing an automatic mode.
Figure 10:
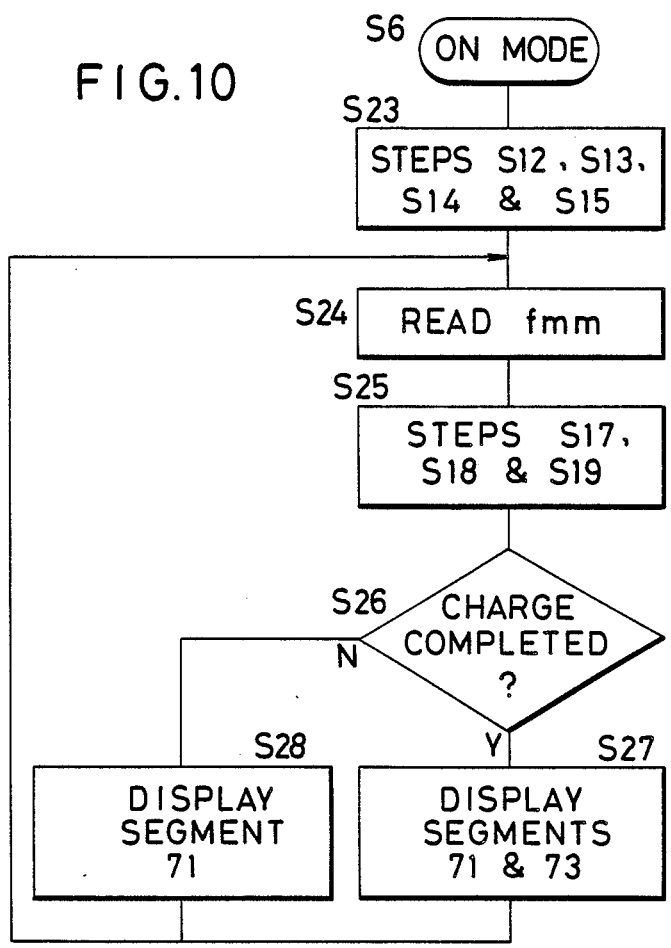
FIG. 10 is a flow chart of an ON mode.
Figure 16:
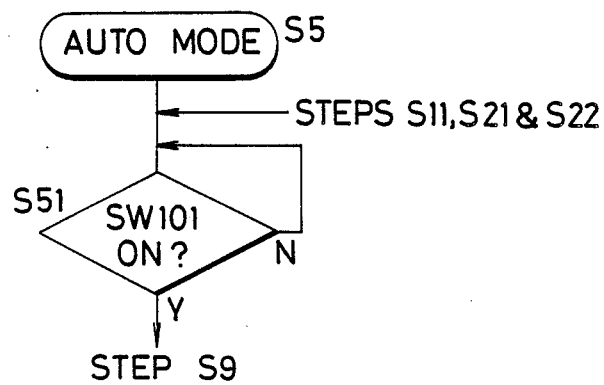
FIG. 16 is a flow chart showing an improved automatic mode.

FIG. 16 shows an improved embodiment of the automatic mode shown in FIG. 9. In FIG. 16, a step S51 discriminates whether the half-push switch 101 is closed. Other steps are same as those shown in FIG. 9.

If the half-push switch 101 is off, the sequence is suspended, so that the position and irradiating angle of the flash unit are maintained in the state immediately before the turning off of the half-push switch 101.

Consequently, in the present improved embodiment of the automatic mode, the lifting or lowering, and the zooming of the flash unit are conducted only when the half-push switch is turned on. It is therefore rendered possible to prevent these operations in unexpected manner due to the continuation of power supply even when the shutter release button is not touched by the operator.

In the following there will be explained the control sequence of the off mode, shown in FIG. 11. The off mode sequence is started by the step S8. At first steps S34, S35 discriminate whether the gear 32 is in the down position. If not, a step S36 reads the signal from the position detecting means 51, and a step S37 discriminates whether the wide position is selected.

If the wide zoom state is not selected, a step S38 turns the motor to the left, thereby zooming the flash case 3, and a loop returning to the step S36 performs the shift to the wide zoom state. This is to make the mechanism compact in the folded state.

If the wide zoom state is selected, a step S39 turns the motor to the right, thereby lowering the support member 5 as described before. Thus a loop returning to the step S34 performs the shift to the pop-down position. When a step S35 discriminate the pop-down position, a step S40 sends an instruction to the flash control circuit 107 for prohibiting the flash light emission, and a step S41 activates the display segments 71 and 72. Then a step S42 discriminates whether the flash light emission is necessary, and, if discriminated as necessary, a step S43 performs a display for recommending the use of flash to the operator. If the flash light emission is discriminated unnecessary, a step S44 deactivates the display segment 73. Thereafter the sequence returns to the step S42, and the display is performed according to whether the flash light emission is required or not at that point.

In the course of the automatic mode, on mode or off mode explained above, in response to the actuation of the release switch 102, the sequence proceeds to the interruption routine for releasing the shutter. However it is also possible to prohibit the interruption routine for shutter release, if the situation is not suitable for shutter releasing, for example during the rotation of the motor 10 or if the charging is not complete while the flash light emission is required in the automatic or on mode.

In the following there will be explained the function after the expiration of the timer 103. As described before, the output 113 of the timer 103 is shifted from the H-level to the L-level, seven seconds after the turning off of the half-push switch 101, or one second after the completion of shutter releasing operation. In response the microcomputer 100 enters a timer interruption routine shown in FIG. 12.

The timer interruption routine is started by a step S111. At first steps S112 and S113 confirm the currently selected flash mode. If it is not the automatic mode, the sequence returns to the main flow. In case of the on mode, the flash unit is maintained in the lifted state, and, in case of the off mode, it is maintained in the lowered state.

In case of the automatic mode, steps S115 and S116 discriminate whether the flash unit is in the lowered position. If it is in the lowered position, the sequence returns to the main flow.

Figure 11:
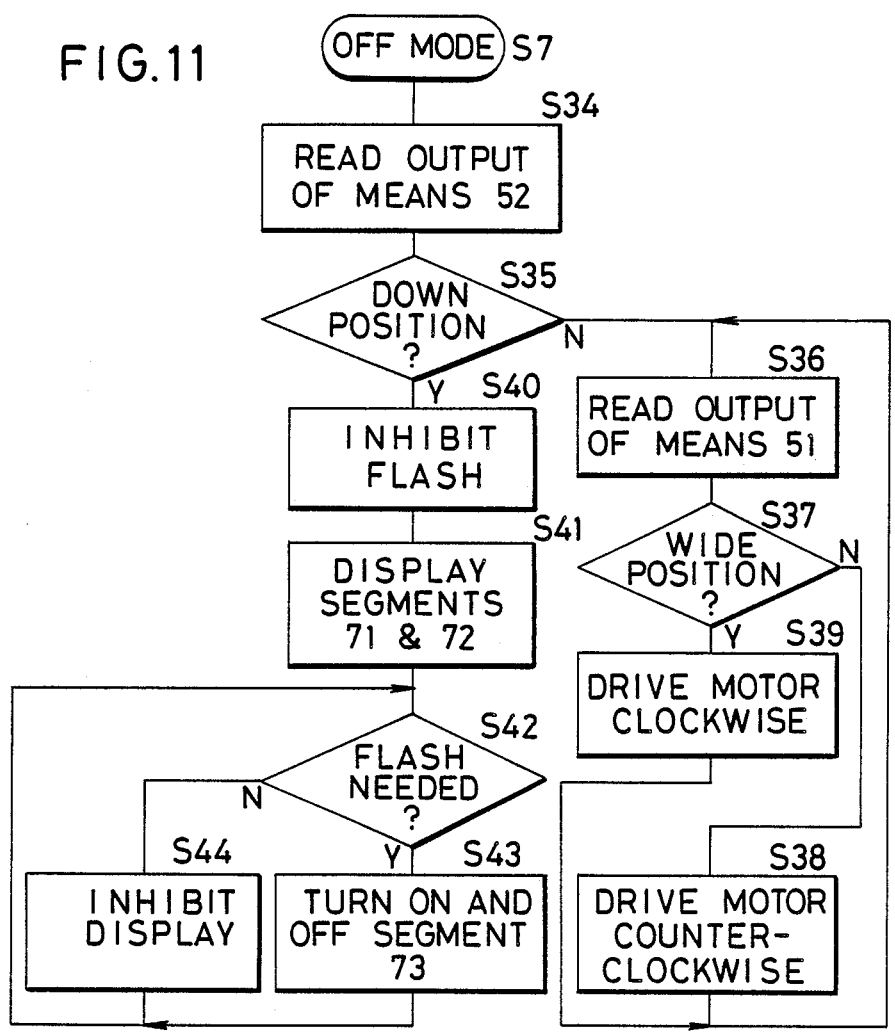
FIG. 11 is a flow chart of an OFF mode.
Figure 12:
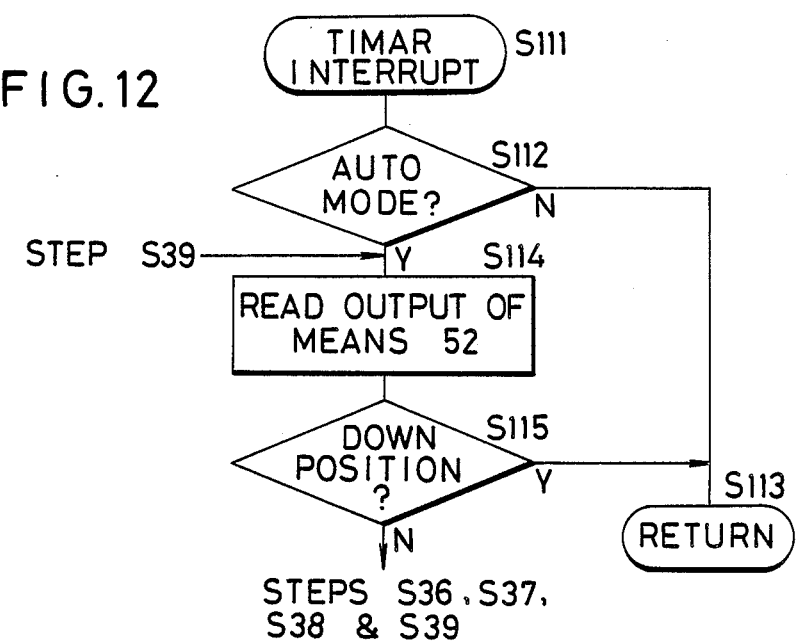
FIG. 12 is a flow chart of a timer interruption sequence.

If it is not in the lowered position, steps S117 to S120, which are same as the steps S36 to S39 shown in FIG. 11, are executed to lower the flash unit. When said lowering operation is completed in a loop returning from the step S120 to S115, the sequence proceeds from the step S116 to S114 whereby the sequence returns to the main flow.

The above-mentioned timer is also utilized for controlling the power supply of the camera, but there may be provided an exclusive timer for the popping down of the flash unit. The operating time of said timer, which is selected as 7 seconds from the turning off of the half-push switch or 1 second from the completion of the shutter releasing operation in the foregoing explanation, can be arbitrarily selected or can be made adjustable by the operator.

In the following there will be explained the function in case the flash unit, which is in the lifted position in the automatic or on mode, is manually forced down.

Figure 15A:
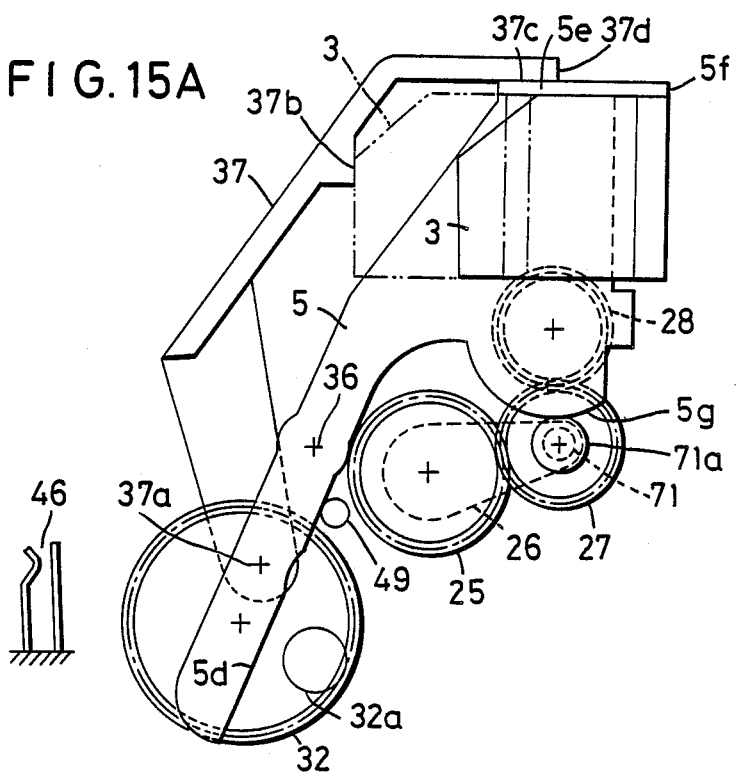
FIGS. 15A and 15B are magnified cross-sectional views of a flash device driving system.

FIG. 15A is a rear side view of the pop-up state shown in FIG. 3A, wherein gears 29, 30 and 31 are omitted.

In FIG. 15A, 71 indicates a shaft for the gear 26 provided on the arm 26, and 71a indicates the end of said shaft 71. Said end 71a comes into contact, at the periphery thereof, with the end 5g of the support member 5 when the arm 26 is turned to the left for bringing the gear 27 into meshing relation with the gear 28, thereby maintaining an appropriate distance between the shafts of said gear 27 and 28. Said end 5g is formed as an arc around the shaft of the gear 28.

Now let us consider a case, in which the case 37 is forced down by an external force, or, is turned to the right about the shaft 37a. According to said rightward rotation of the case 37, the lower face 37c thereof presses the upper part 5e of the support member 5, whereby said support member 5 also turns to the right about the shaft 36. Then the arm 26 turns to the right about the shaft of the gear 25, since the end 5g pushes the head 71a as the result of rightward rotation of the support member 5.

Also if the flash case 3 is in a position other than the wide zoom position in the above-explained procedure, the protruding part 37b of the case 37 pushes the rear end of the flash case thereby moving the flash case 3 to the wide zoom position against the function of the spring 7.

Figure 15B:
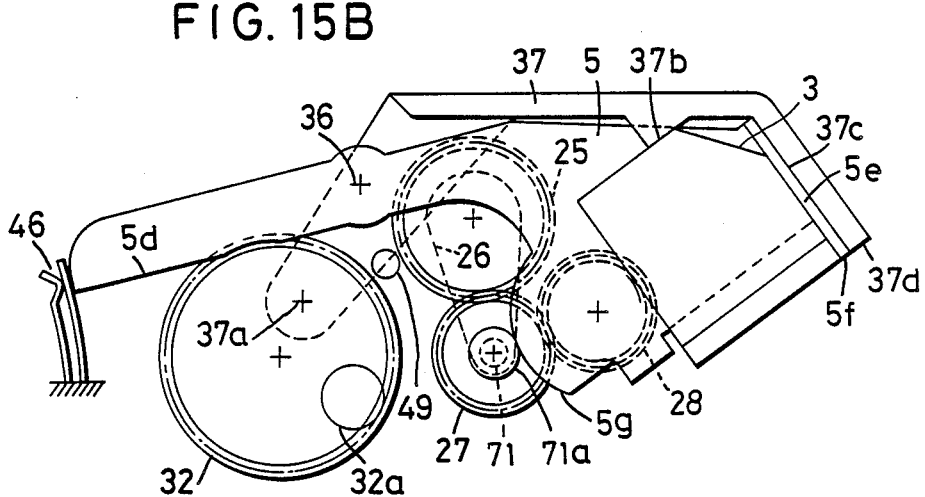

FIG. 15B shows a state after the forced rotation to the pop-down position. In comparison with the case of lowering of the light emission unit by the motor 10 in FIG. 3B, the situation is different in that the pin 32a is in the up position and that the gear 27 is meshing with the gear 28. Also in this state shown in FIG. 15B, the leftward rotation of the gear 25 can be transmitted to the gear 28, as the distance between the shafts of the gears 27, 28 is secured by the engagement between the end 5g of the support member 5 and the head 71a.

Figure 13:
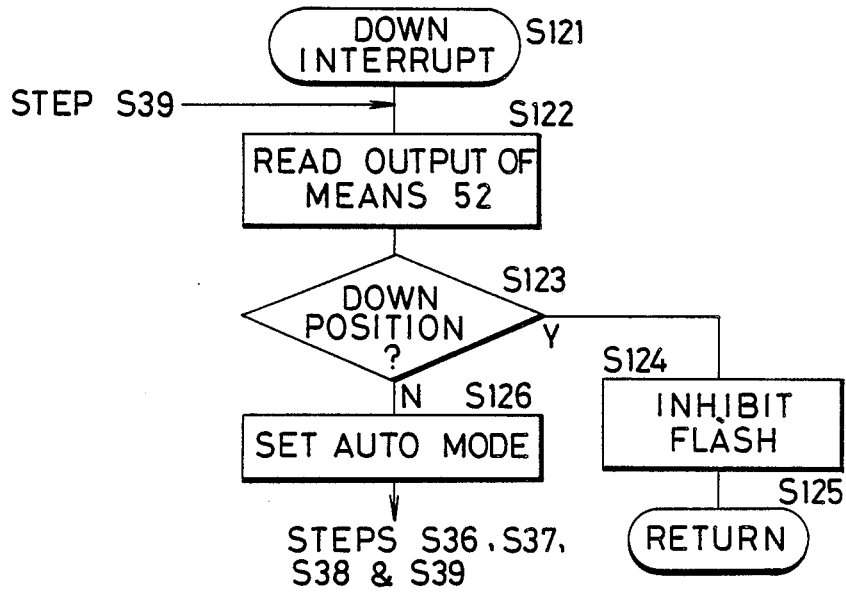
FIG. 13 is a flow chart of a flash device pop-down sequence.
Figure 14:
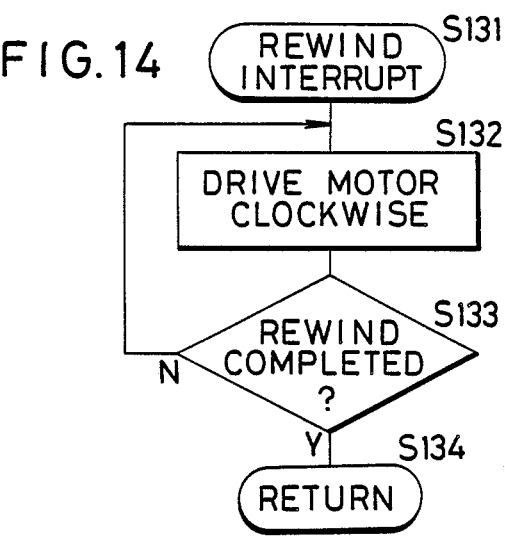
FIG. 14 is a flow chart of a rewinding interruption sequence.

When the switch 46 is turned on in the state shown in FIG. 15B, the microcomputer 100 enters a down interruption sequence shown in FIG. 13.

In FIG. 13, the down interruption routine is started in a step S121. At first steps S122 and S123 discriminate the state of the gear 32. If the gear 32 is in the down position shown in FIG. 3B, a step S124 prohibits the flash light emission, and the sequence returns to the main flow in a step S125. On the other hand, if the lowering of the light emission unit is executed by the motor, the sequence immediately returns to the main flow in this routine.

If the gear 32 is not in the down position, or is in a position shown in FIG. 15B, a step S126 sets the automatic mode.

Succeeding steps S127 to S130 are same as the steps S36 to S39 shown in FIG. 11. The step S128 discriminates whether the flash unit is in the wide position, and, if it is in the wide position, the step S130 turns the motor to the right, in order to align the support member 5 with the position detecting means 52. On the other hand, if it is not in the wide position, the step S129 turns the motor to the left, in order to align the flash case 3 with the position detecting means 51. Thereafter the sequence returns to the step S127, and further returns from the step S130 to the step S122, thus eventually proceeding to the step S125.

Thus, when the cover 37 is pushed from the lifted position to the lowered position in the on mode, the flash mode is automatically returned to the automatic mode in the step S126. It is therefore rendered possible to avoid unnecessary flash light emission, caused by the forgotten shift from the on mode to the automatic mode.

In addition, since the pop-down operation is executed by the motor 10, it is made possible to dispense with a member for maintaining the support member 5 in the lowered position, thus achieving a lower cost with a simpler structure.

At last there will be explained the film rewinding operation in the present embodiment. When the lever 42 shown in FIG. 1 is so shifted that the mark 42b is aligned with the mark 44, the gear 15 is disengaged from the gear 18 and meshes with the gear 40 as described before. If the switch 45 is turned on in this state, the microcomputer 100 enters a rewind interruption routine shown in FIG. 14. Said routine is started by a step S131. Then a step S132 turns the motor 10 to the right, thereby transmitting the rotation to the fork 41a of the gear 41 and thus rewinding the film. Then a step S133 discriminates whether the completion of film rewinding has been detected. If not detected, the sequence returns to the step S132, and, if detected, the sequence returns from a step S134 to the main flow. The detection of completion of film rewinding can be achieved by various known methods, such as the use of a switch for detecting the loading state of the film, and will not, therefore, be explained in detail.

In the present embodiment, as explained in the foregoing, the lifting and lowering of the flash emission unit and the change of irradiation angle thereof are not achieved by direct driving with a motor but by the biasing force of springs, so that excessive load is not given to the transmission system even when the flash emission unit in the lifted position is manually forced down.

Also in the present embodiment, the rotation of motor in a direction is utilized to reciprocate the flash case between the wide position and the tele position, while the rotation of the other direction is utilized to reciprocate the flash emission unit between the lifted position and the lowered position, so that a separate clutch is not needed for example in case of shifting the flash emission unit from the lowered position to the lifted position and again to the lowered position.

What is claimed is:

1. A camera comprising:
   (a) flash emission means;
   (b) regulating means for regulating the irradiating angle of the light from said flash emission means, said regulation means having at least a first state and a second state wherein said irradiating angle in said first state is wider than that in said second state;
   (c) a photographing lens;
   (d) displacing means for displacing said flash emission means between a first position and a second position which is more distant than said first position from the optical axis of said photographing lens;
   (e) a drive shaft to be rotated by a motor; and
   (f) transmission means for transmitting the rotation of said drive shaft to said regulating means in case of the rotation of said drive shaft in one direction, and transmitting the rotation of said drive shaft to said displacing means in case of the rotation of said drive shaft in the other direction, said regulating means being adapted to shift from one of said first and second states to the other in response to the rotation of said drive shaft in the first-mentioned direction, and said displacing means being adapted to shift from one of said first and second positions to the other in response to the rotation of said drive shaft in said the other direction.

2. A camera according to claim 1, wherein said transmission means is constructed in such a manner not to transmit the rotation of said drive shaft in the first-mentioned direction to said displacing means, and not to transmit the rotation of said drive shaft in said the other direction to said regulating means.

3. A camera according to claim 1, wherein said flash emission means comprises an optical member and a flash emitting unit, and said regulating means is adapted, in response to the rotation of said drive shaft in the first-mentioned direction, to reciprocate at least one of said optical member and said flash emitting unit between a position corresponding to said first state and a position corresponding to said second state.

4. A camera according to claim 3, wherein said optical member is so constructed as to diffuse the light from said flash emitting unit.

5. A camera according to claim 1, wherein said displacing means is adapted, in response to the rotation of said drive shaft in said the other direction, to reciprocate said flash emission means between said first position and said second position.

6. A camera comprising:
   (a) flash emission means;
   (b) a motor;
   (c) regulating means responsive to one direction of rotation of the motor for regulating the irradiating angle of the light from said flash emission means, wherein said regulating means is adapted, in a reference state, to cause said flash emission means to emit the light with a predetermined irradiating angle, and, in a state different from said reference state, to cause said flash emission means to emit the light with a different irradiating angle;
   (d) a photographing lens;
   (e) displacing means responsive to the other direction of rotation of said motor for rotating said flash emission means about a fixed axis to displace said flash emission means between a first position and a second position which is more distant than said first position from the optical axis of said photographing lens; and (f) control means for shifting, in case said regulating means is in a state different from said reference state and said flash emission means moves from said second position to said first position, said regulating means to said reference state before the arrival of said flash emission means at said first position.

7. A camera according to claim 6, wherein said flash emission means comprises an optical member and a flash emitting unit, and said regulating means is adapted to cause a relative displacement between said optical member and said flash emitting unit.

8. A camera according to claim 7, wherein said regulating means is adapted to regulate said flash emission means in such a manner that the irradiating angle in said reference state is wider than that in a different state.

9. A camera comprising:
(a) detection means for detecting the luminosity of an object and releasing a luminosity detection signal;
(b) flash emission means;
(c) a photographing lens;
(d) displacing means for displacing said flash emission means between a first position and a second position which is more distant than said first position from the optical axis of said photographing lens;
(e) control means having a first mode for causing said displacing means to displace said flash emission means from said first position to said second position in response to said luminosity detection signal, and a second mode for causing said displacing means to displace said flash emission means from said first position to said second position irrespective of said luminosity detection signal;
(f) displacement detection means for releasing a displacement detection signal upon detecting the displacement of said flash emission means from said second position to said first position in said second mode of said control means; and
(g) switching means for switching said control means from said second mode to said first mode in response to said displacement detection signal.

10. A camera according to claim 9, further comprising regulating means for regulating the irradiating angle of the light from said flash emission means, wherein said regulating means has at least a first state and a second state and is so constructed that the irradiating angle of the light in said first state is wider than that in said second state.

11. A camera according to claim 10, further comprising a motor-driven drive shaft, wherein said regulating means is adapted to shift from one of said first and second states to the other in response to the rotation of said drive shaft in one direction, and said displacing means is adapted to displace said flash emission means from one of said first and second positions to the other in response to the rotation of said drive shaft in the other direction.

12. A camera according to claim 11, wherein said control means is adapted, in said first mode, to displace said flash emission means from said second position to said first position in response to the rotation of said drive shaft in a direction, and, in said second mode, not to displace said flash emission means from said second position to said first mode, and the displacement of said flash emission means from said second position to said first position in said second mode is conducted manually.

13. A camera according to claim 12, wherein said control means in said second mode does not activate the motor for displacing the flash emission means from said second position to said first position.

14. A camera comprising:
(a) flash emission means;
(b) a photographing lens;
(c) a motor; and
(d) displacing means for displacing said flash emission means between a first position and a second position which is more distant than said first position from the optical axis of said photographing lens, said displacing means being adapted to effect the displacement of said flash emission means from said first position to said second position and from said second position to said first position, by the rotation of said motor in the same direction.

15. A camera comprising:
(a) flash emission means;
(b) motor; and
(c) regulating means for regulating the irradiating angle of the light from said flash emission means, said regulating means having at least a first state and a second state in such a manner that the irradiating angle of the light in said first state is different from that in said second state, and further adapted to achieve shifts from said first state to said second state and from said second state to said first state by means of the rotation of said motor in the same direction.

* * * * *